United States Patent
Barnard et al.

[11] Patent Number: 6,129,887
[45] Date of Patent: Oct. 10, 2000

[54] PROCESS TO PRODUCE SILICON CARBIDE FIBERS USING A CONTROLLED CONCENTRATION OF BORON OXIDE VAPOR

[75] Inventors: Thomas Duncan Barnard; Jonathan Lipowitz; Kimmai Thi Nguyen, all of Midland, Mich.

[73] Assignee: Dow Corning Corporation, Midland, Mich.

[21] Appl. No.: 09/140,824

[22] Filed: Aug. 26, 1998

[51] Int. Cl.[7] ............................................. C04B 40/00
[52] U.S. Cl. ................................... 264/640; 264/82
[58] Field of Search ........................ 264/82, 625, 640

[56] References Cited

U.S. PATENT DOCUMENTS

| | | | |
|---|---|---|---|
| 5,071,600 | 12/1991 | Deleeuw et al. | 264/29.2 |
| 5,268,336 | 12/1993 | Deleeuw et al. | 501/88 |
| 5,279,780 | 1/1994 | Lipowitz et al. | 264/82 |
| 5,366,943 | 11/1994 | Lipowitz et al. | 501/95 |
| 5,707,568 | 1/1998 | Deleeuw et al. | 264/29.2 |

FOREIGN PATENT DOCUMENTS

| | | | |
|---|---|---|---|
| WO 94-02430 | 2/1994 | WIPO | C04B 35/56 |

OTHER PUBLICATIONS

Sidgwick, N.V. "The Chemical Elements and Their Compounds."

Wiley & Sons. "Encyclopedia of Chemical Technology."

*Primary Examiner*—Christopher A. Fiorilla
*Attorney, Agent, or Firm*—Robert L. McKellar

[57] ABSTRACT

A process for producing polycrystalline silicon carbide includes heating an amorphous ceramic fiber that contains silicon and carbon in an environment containing boron oxide vapor. The boron oxide vapor is produced in situ by the reaction of a boron containing material such as boron carbide and an oxidizing agent such as carbon dioxide, and the amount of boron oxide vapor can be controlled by varying the amount and rate of addition of the oxidizing agent.

13 Claims, 1 Drawing Sheet

PROCESS TO PRODUCE SILICON CARBIDE FIBERS USING A CONTROLLED CONCENTRATION OF BORON OXIDE VAPOR

This invention was made with United States Government support under NASA-EPM Contract F-731-704. The United States Government has certain rights in the invention.

FIELD OF THE INVENTION

This invention relates to a process to produce a polycrystalline silicon carbide fiber. The process employs a controlled concentration of boron oxide vapor. The boron oxide vapor is generated by a reaction of a boron containing material with an oxidizing agent in situ. The rate of boron oxide generation is controlled by varying the rate of addition of the oxidizing agent.

BACKGROUND OF THE INVENTION

Ceramic fibers, such as silicon carbide fibers, are used as reinforcement for ceramic- and metal- matrix composites. The fibers enhance toughness, strength, stiffness, and creep resistance in the composites. Silicon carbide fiber is desirable as a reinforcing fiber because it is predicted to have high elastic modulus and high tensile strength.

Several methods are known in the art for making silicon carbide (SiC) fibers. For example, U.S. Pat. No. 5,279,780 issued to Lipowitz et al. on Jan. 18, 1994, discloses a near-stoichiometric polycrystalline silicon carbide fiber that can withstand temperatures up to 1,400° C. while maintaining a useful strength. The process comprises heating an amorphous or microcrystalline ceramic fiber containing silicon, carbon, and oxygen in an environment comprising a volatile sintering aid. The sintering aid was placed in the furnace and allowed to volatilize in the presence of the fiber during pyrolysis.

U.S. Pat. No. 5,366,943 issued to Lipowitz et al. on Nov. 24, 1994, discloses a process for preparing a polycrystalline silicon carbide fiber that can withstand temperatures up to 1,400° C. The process comprises heating an amorphous or microcrystalline ceramic fiber containing silicon, carbon, and at least one element selected from the group consisting of titanium, zirconium, and chlorine in an environment comprising a volatile sintering aid. The volatile sintering aid can be a compound of iron, magnesium, lithium, beryllium, boron, aluminum, thorium, yttrium, lanthanum, cerium, and mixtures thereof. The sintering aid is volatilized by placing solid or liquid sintering aid in the furnace with the ceramic fiber during heating.

However, in these processes the sintering aid is placed in the furnace and allowed to volatilize when the fiber is heated. The amount of volatile sintering aid in the furnace depends on the vapor pressure of the sintering aid at the temperature in the furnace. This can be undesirable when boron oxide is the sintering aid. If too much boron oxide is present, the boron oxide can oxidize silicon carbide, thereby weakening the polycrystalline silicon carbide fiber produced.

Therefore, one object of this invention is to provide a process for preparing silicon carbide fiber using a controlled concentration of boron oxide vapor at, or any level below, saturation in the furnace. The concentration of boron oxide vapor in the furnace is controlled by producing the boron oxide vapor in situ by the reaction of a boron containing material with an oxidizing agent. The rate of addition of the oxidizing agent is varied to produce the controlled concentration of boron oxide vapor.

SUMMARY OF THE INVENTION

This invention relates to a process for producing a polycrystalline silicon carbide fiber. The process comprises heating an amorphous ceramic fiber comprising silicon, carbon, and oxygen in an environment comprising a controlled concentration boron oxide vapor. The concentration of boron oxide vapor is controlled by generating the boron oxide vapor in situ by the reaction of a boron containing material with an oxidizing agent. The oxidizing agent is the limiting reagent. The rate of addition of oxidizing agent to the boron containing material is varied to produce the controlled concentration of boron oxide vapor.

DETAILED DESCRIPTION OF THE INVENTION

Figure 1:
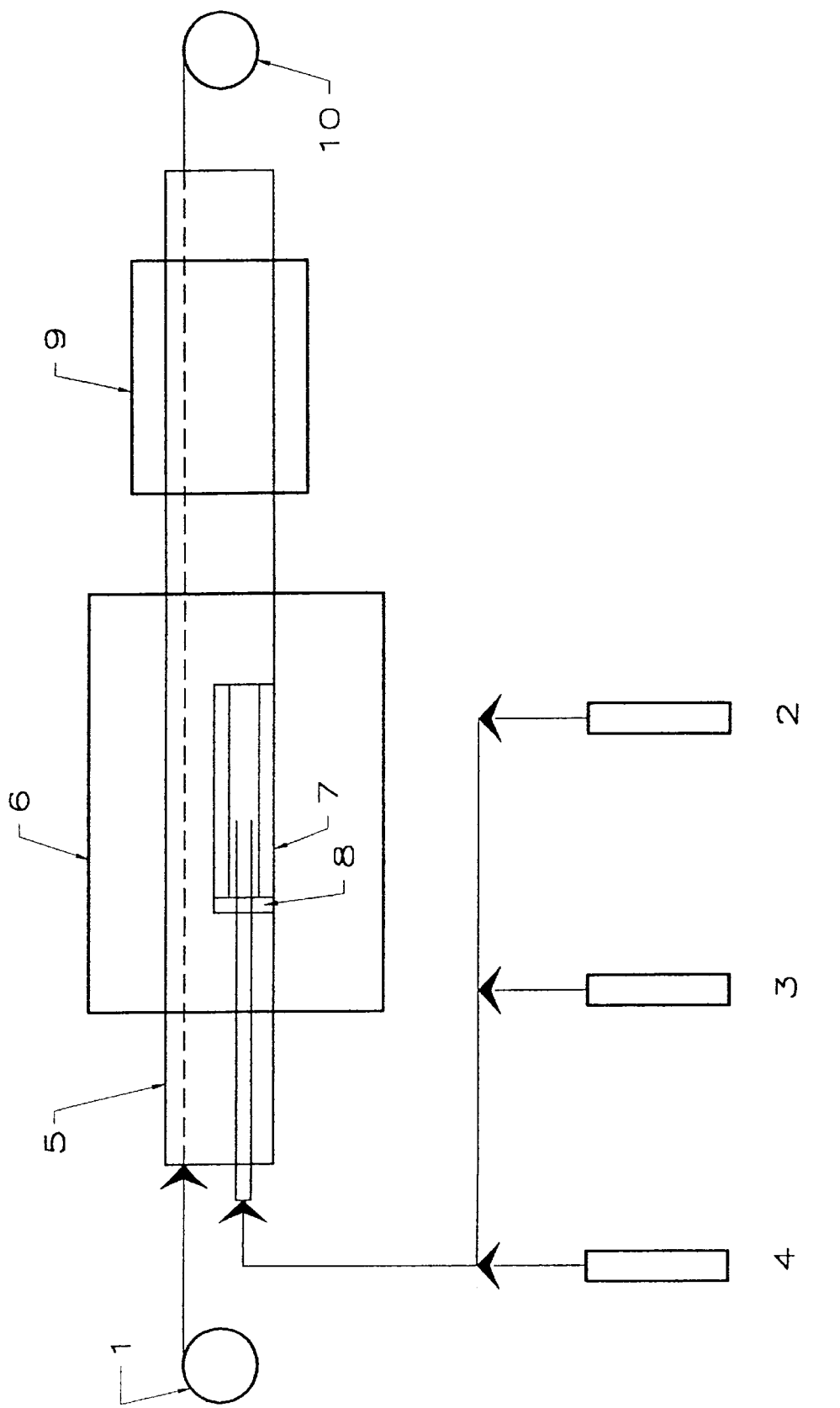
FIG. 1 is a schematic diagram of the semi-batch process of this invention.

This invention relates to a process for producing a polycrystalline silicon carbide (SiC) fiber. The process comprises heating an amorphous ceramic fiber comprising silicon, carbon, and oxygen in an environment comprising a controlled concentration of boron oxide vapor at a temperature sufficient to form a polycrystalline silicon carbide fiber. The boron oxide vapor is produced by a reaction of a boron containing material and an oxidizing agent in situ during heating. The boron containing material is selected from the group consisting of boron carbide ($B_4C$), boron, and $B_6O$. The oxidizing agent is the limiting reagent in the reaction to produce boron oxide. The rate of addition of oxidizing agent to the boron containing material is varied to produce the controlled concentration of boron oxide vapor.

The amorphous ceramic fiber comprises silicon, carbon, and oxygen. "Amorphous" means that the fiber is primarily non-crystalline and includes fibers that contain crystallites in an amorphous phase. Preferably, the silicon and carbon are present in near stoichiometric or moderately carbon rich amounts. Other elements, however, can also be present. These include, for example oxygen, nitrogen, titanium, zirconium, chlorine, and any other elements which can either be volatilized out of the fiber during pyrolysis or remain in the fiber without affecting the integrity of the resultant fiber.

The oxygen content of the amorphous ceramic fiber is typically 0.1 to 25 wt %, preferably 10 to 12 wt %. Oxygen content should not exceed 25 to 30 wt %, or the polycrystalline silicon carbide fiber may have low char yield and high porosity. Oxygen generally volatilizes out of the fiber upon heating to temperatures above about 1,300° C. in the form of either SiO or CO. When the ceramic fiber is silicon-rich (i.e. greater than a stoichiometric amount of silicon compared to carbon) the oxygen tends to leave as SiO so as to drive the fiber towards stoichiometric SiC. Similarly, when the ceramic fiber is carbon-rich (i.e. greater than a stoichiometric amount of carbon compared to silicon) the oxygen tends to leave as CO so as to drive the fiber towards stoichiometric SiC. Therefore, the fibers can be either silicon-rich or carbon-rich provided that there is sufficient oxygen present to cause the desired stoichiometry modification Notwithstanding this, however, the silicon content generally should not significantly exceed the sum of the carbon and oxygen contents on an atomic basis. If this occurs, the product may contain a substantial amount of excess silicon which can lead to excessive grain growth and loss of strength.

If the ceramic fiber contains nitrogen, most of said nitrogen generally volatilizes out of the fiber upon heating to temperatures above about 1,400° C. in the form of $N_2$. Thus, nitrogen does little to affect the Si—C stoichiometry of the fiber and it may be incorporated into the fibers of the invention as long as the above SiC stoichiometry can be maintained. It should be noted that some nitrogen may remain in the fiber as the nitride of the sintering aid (e.g. BN). The inventors believe that this nitride may interfere with complete densification of the fiber.

Methods for producing the amorphous ceramic fibers are known in the art. For example, one method comprises spinning a pre-ceramic polymer composition comprising a silicon-containing polymer into green fibers, followed by infusibilization and pyrolysis. Alternative approaches include sol gel processing, chemical vapor deposition, and others.

Amorphous ceramic fibers useful in this process are described in U.S. Pat. No. 5,279,780 issued to Lipowitz et al. on Jan. 18, 1994, which is hereby incorporated by reference. Suitable amorphous ceramic fibers are exemplified by SiCO, SiCN, SiCON, and SiCOTi. Preferred are SiCO and SiCOTi fibers. These fibers are commercially available as NICALON® fibers from Nippon Carbon and TYRANNO® fibers from UBE Industries, respectively. NICALON® fibers are SiCO fibers with diameters of 10 to 20 micrometers. TYRANNO® fibers are SiCOTi fibers with diameters of 8–12 micrometers.

Commercially available amorphous ceramic fibers often contain a sizing to improve handling characteristics. Although not necessary, it is desirable to remove this sizing before treatment. Removal of the sizing can be accomplished by methods known in the art such as chemically dissolving the sizing or by heating the fiber to a temperature sufficient to remove the sizing.

The amorphous ceramic fibers may be of any length. Although this process can be operated in a batch mode, semi-batch and continuous modes are preferred because they offer greater process efficiency than batch mode. The length of the amorphous ceramic fibers used in the batch mode is not critical. The amorphous ceramic fibers are preferably of sufficient length to run in the preferred modes.

The process of this invention comprises heating the amorphous ceramic fiber in an environment comprising a controlled concentration of boron oxide vapor. The environment preferably further comprises carbon monoxide as a process aid. The process aid increases production rate. The environment may further comprise an inert gas, such as argon or helium.

The boron oxide vapor is produced by reacting a boron containing material selected from the group consisting of boron carbide, boron, and $B_6O$ with an oxidizing agent selected from the group consisting of carbon dioxide, carbon monoxide, oxygen, and combinations thereof at a temperature of 1,300 to 1,600° C. Boron carbide is preferred. Boron carbide is known in the art and is commercially available from ESK Engineered Ceramics.

In the semi-batch mode, the boron oxide is produced in situ by placing a charge of the boron containing material in a furnace and adding the oxidizing agent thereto. The method of preparing the charge of the boron containing material is not critical. For example, boron carbide powder can be mixed with a resin and a solvent, formed, and heated to produce a boron carbide charge. The amount of boron containing material must be in excess of the amount of oxidizing agent.

The oxidizing agent can be added by any means allowing for control of the rate of addition. The rate of addition of oxidizing agent to the furnace is varied to produce a controlled concentration of boron oxide vapor in the environment in the furnace. For example, in the semi-batch process, the oxidizing agent can be fed into the furnace in a manner that allows it to contact the charge of boron containing material. The oxidizing agent will then react with the boron containing material to form the boron oxide vapor. The oxidizing agent is the limiting reagent to produce boron oxide vapor in the semi-batch process. The amount of boron oxide vapor formed depends on the thermodynamic equilibrium of the oxidizing agent and boron containing material with boron oxide.

The amount of oxidizing agent and its rate of addition to the furnace will depend on the amount of boron oxide vapor desired. The desired amount of boron oxide vapor in the environment in the furnace will depend on the type of amorphous ceramic fiber used, the residence time of the fiber in the furnace, and the temperature in the furnace.

Typically, the minimum amount of oxidizing agent added to the furnace is an amount sufficient to provide a boron oxide concentration in the furnace sufficient to give 0.1 wt % boron in the polycrystalline silicon carbide fiber produced. Preferably, the minimum amount of oxidizing agent added to the furnace is an amount sufficient to provide a boron oxide concentration in the furnace sufficient to give 0.3 wt % boron in the polycrystalline silicon carbide fiber.

The maximum amount of oxidizing agent added is sufficient to provide a boron oxide concentration of up to saturation of the environment in the furnace. The maximum amount of oxidizing agent is sufficient to produce a concentration of boron oxide that yields a polycrystalline silicon carbide fiber with good properties, while minimizing corrosion in the furnace and minimizing oxidation of silicon carbide that can weaken the polycrystalline silicon carbide fiber.

The amount of carbon monoxide added to the furnace as a process aid is such that the environment in the furnace contains 20 to 80 mol % carbon monoxide. However, the concentration of carbon dioxide as a process aid in the environment in the furnace will depend on the type of fiber used. When the amorphous ceramic fiber is SiCO fiber, the concentration of carbon monoxide is preferably 45 to 75 mol %. When the amorphous ceramic fiber is SiCOTi fiber, the concentration of carbon monoxide is preferably 20 to 40mol %. If carbon monoxide will be used as an oxidizing agent, the amount of carbon monoxide that will react with the boron containing material to form boron oxide is additional to the amount of carbon monoxide added as the process aid. One skilled in the art would be able to select amounts of oxidizing agent, carbon monoxide as a process aid, and inert gas to add to the furnace to produce the desired concentrations of boron oxide vapor and carbon monoxide as a process aid in the environment in the furnace by using thermodynamic equilibrium calculations.

When the amorphous ceramic fiber is SiCOTi fiber, the maximum concentration of boron oxide vapor is preferably the saturation concentration of boron oxide vapor in the environment. "Saturation concentration" means the maximum amount of boron oxide vapor that can be present in the environment as a vapor. The saturation concentration will vary depending on the concentration of carbon monoxide and the temperature in the furnace. When the amorphous ceramic fiber is SiCO fiber, the concentration of boron oxide vapor is preferably 10 to 50% of the saturation concentration of boron oxide vapor in the environment in the furnace.

The amorphous ceramic fiber is heated to a temperature sufficient to form the polycrystalline silicon carbide fiber from the amorphous ceramic fiber. "Polycrystalline" means that the fiber has at least 75% crystallinity with a small average crystallite size (e.g., less than 1 micrometer). Typically, the amorphous ceramic fiber is heated at 1,400 to 2,200° C. Preferably, the amorphous ceramic fiber is heated and subsequently densified. Heating and densification can be carried out in different zones in one furnace, or heating may be carried out in one furnace, and densification can be carried out in a separate furnace. The heating temperature is typically 1,400 to 1,700° C., preferably 1,500 to 1,600° C., in the environment described above.

The residence time of the fiber in the furnace is the time that the fiber is heated. Residence time must be sufficient to allow for incorporation of boron into the fiber and substantially complete removal of the volatile elements from the fibers. The residence time depends on the length of the furnace, the concentrations of boron oxide vapor and carbon monoxide as a process aid in the environment, and temperature. Typically, the residence time ranges from 2 minutes to several hours.

Densification can be carried out in an environment that preferably does not contain any boron oxide or oxidizing agent. An inert environment such as pure argon is suitable for densification. Densification is typically carried out by heating the fiber, which has the boron incorporated therein, to a temperature of 1,800 to 2,200° C., preferably 1,800 to 2,000° C.

Any furnace suitable for continuous or semi-batch production of fibers may be used herein. However, boron oxide is corrosive, so it is preferable to use a furnace with a carbon lining.

The above process describes the conversion of pre-formed ceramic fibers (i.e., from a commercial source) to polycrystalline silicon carbide fibers. However, this process can also be used in a standard fiber manufacturing process, wherein fibers are formed by spinning, curing, and pyrolyzing. This process comprises spinning a pre-ceramic polymer to form a green fiber, curing the green fiber, and carrying out pyrolysis on the cured fiber in an environment comprising boron oxide vapor and carbon monoxide as a process aid at a temperature sufficient to convert the cured fiber to a polycrystalline silicon carbide fiber, wherein the boron oxide vapor is produced by a reaction in situ during pyrolysis.

The polycrystalline silicon carbide fiber produced can withstand temperatures of 1,400° C. or greater. The boron content is typically at least 0.1 wt %, and can be up to 4 wt %. Preferably the boron content is 0.3 wt % to 2.5 wt %. However, boron content will vary depending on the amorphous ceramic fiber used to form the polycrystalline silicon carbide fiber. Typically, polycrystalline silicon carbide fiber produced from SiCO fiber contains 0.5 to 1 wt % boron, and polycrystalline silicon carbide fiber produced from SiCOTi fiber contains 2 to 2.5 wt % boron. The polycrystalline silicon carbide fiber typically has a tensile strength of at least 2,070 MPa, preferably at least 2,760 MPa. The polycrystalline silicon carbide fiber typically has a modulus of 345 to 414 GPa, preferably 345 to 483 GPa.

One advantage of this process is that the amount of boron oxide vapor is controlled by the rate of addition of oxidizing agent the furnace, rather than by the vapor pressure of boron oxide at the temperature in the furnace. Using this method, the amount of boron oxide vapor can be controlled at any level below saturation, up to saturation, of the environment in the furnace. Another advantage of this invention is that the concentration of boron oxide vapor can be controlled to optimize the properties of the polycrystalline silicon carbide fiber produced while minimizing excess boron oxide that can cause corrosion of the furnace components.

EXAMPLES

These examples are intended to illustrate the invention to those skilled in the art and should not be interpreted as limiting the scope of the invention set forth in the claims.

A semi-batch process was used in these Examples and is illustrated in FIG. 1. The fiber from a fiber supply spool 1 enters a first furnace 6. Carbon dioxide is metered into the first furnace 6 through a first flow meter 2. Carbon monoxide is metered into the first furnace 6 through a second flow meter 3. Boron oxide is formed when the gases pass through a boron carbide charge 7. A boron nitride spacer 8 is used to prevent corrosion of the furnace. Argon 5 is metered into the first furnace 6 with the fiber and also through a third flow meter 4. The fiber then passes through a second furnace 9 and is collected on a silicon carbide fiber winder 10.

Reference Example 1

The following were mixed to a clay-like consistency: 120 g boron carbide powder, 60 g phenolic resin, and 50 g polyvinylalcohol. The mixture was formed on 0.635 cm stainless steel tubing and wrapped with graphoil. The tubing was heated at 90° C. overnight. The boron carbide charge was then removed from the tubing and installed in the first furnace 6.

Example 1

TYRANNO® (SiCOTi) fiber with diameter of 8–12 micrometers, was fed through the furnaces at a speed of 0.339 cm/s. Argon, carbon monoxide, and carbon dioxide were metered into the first furnace through the boron carbide charge, and thereafter the gases passed into the portion of the first furnace through which the fiber passed. The fiber then passed through the second furnace and was collected on the fiber winder. The gas flow rates and furnace temperatures are shown in Table 1-1, below. The tensile strength and modulus of the resulting fiber are shown in Table 1-2. Polycrystalline silicon carbide fibers were produced in all instances

TABLE 1-1

| | Furnace Conditions | | | | |
|---|---|---|---|---|---|
| Sample # | $CO_2$ (ml/min) | CO (ml/min) | Argon (ml/min) | First Furnace (° C.) | Second Furnace (° C.) |
| 1A | 60 | 150 | 400 | 1580 | 1880 |
| 1B | 60 | 175 | 375 | 1580 | 1880 |
| 1C | 60 | 200 | 350 | 1580 | 1920 |
| 1D | 60 | 250 | 300 | 1580 | 1880 |
| 1E | 60 | 0 | 400 | 1580 | 1880 |
| *1F | 60 | 250 | 300 | 1580 | 1880 |

*A baffle was installed in the first furnace to maximize contact time of the gas with the fiber.

TABLE 1-2

| | Fiber Properties | |
|---|---|---|
| Sample # | Tensile Strength (MPa) | Modulus (GPa) |
| 1A | NR | NR |
| 1B | NR | NR |
| 1C | NR | NR |
| 1D | 3,091 | 421 |
| 1E | NR | NR |
| 1F | 2,553 | 373 |

NR means that the tensile strength and modulus were not recorded.

Example 2

NICALON® (SiCO) fiber with diameter 10–20 micrometers, was fed through the furnaces at a speed of 0.339 cm/s. Argon, carbon monoxide, and carbon dioxide were metered into the first furnace through the boron carbide charge of Reference Example 1 and thereafter the gases passed into the portion of the first furnace through which the fiber passed. The fiber then passed through the second furnace and was collected on the fiber winder. The gas flow rates and furnace temperatures are shown in Table 2-1, below. The tensile strength and modulus of the resulting fiber are shown in Table 2-2.

TABLE 2-1

Furnace Conditions

| Sample # | $CO_2$ (ml/min) | CO (ml/min) | Argon (ml/min) | First Furnace (° C.) | Second Furnace (° C.) |
|---|---|---|---|---|---|
| 2 | 15 | 350 | 200 | 1580 | 1920 |

TABLE 2-2

Fiber Properties

| Sample # | Tensile Strength (MPa) | Modulus (GPa) |
|---|---|---|
| 2 | 2,380 | 462 |

We claim:

1. A process for producing polycrystalline silicon carbide fiber comprising heating an amorphous ceramic fiber comprising silicon, carbon, and oxygen in an environment comprising boron oxide vapor at a temperature sufficient to convert the amorphous ceramic fiber to a polycrystalline silicon carbide fiber, wherein the boron oxide vapor is produced by a reaction of a boron containing material with an oxidizing agent in situ during heating; and wherein the boron containing material is selected from the group consisting of boron carbide, boron, and $B_6O$, and the oxidizing agent is selected from the group consisting of carbon dioxide, carbon monoxide, oxygen, and combinations thereof.

2. The process of claim 1, wherein the amorphous ceramic fiber further comprises elements selected from the group consisting of nitrogen, titanium, zirconium, and chlorine.

3. The process of claim 1, wherein the environment in the furnace contains 20 to 80 mol % carbon monoxide as a process aid.

4. The process of claim 3, wherein the amorphous ceramic fiber is SiCO fiber and the carbon monoxide as a process aid is 45 to 75 mol % of the environment.

5. The process of claim 3, wherein the amorphous ceramic fiber is SiCOTi fiber, and the carbon monoxide as a process aid is 20 to 40 mol % of the environment.

6. The process of claim 1, wherein the environment comprises a minimum amount of boron oxide vapor sufficient to provide 0.1 wt % boron in the polycrystalline silicon carbide fiber, to a maximum amount of boron oxide vapor equal to saturation concentration of boron oxide vapor in the environment.

7. The process of claim 1, wherein the amorphous ceramic fiber is SiCO fiber, and the environment comprises an amount of boron oxide vapor equal to 10 to 50% of the saturation concentration of boron oxide vapor in the environment.

8. The process of claim 1, wherein heating is carried out at a temperature of 1,400 to 1,700° C.

9. The process of claim 8, wherein heating is carried out at a temperature of 1,500 to 1,600° C.

10. A process for producing a polycrystalline silicon carbide fiber comprising
   i) heating at a temperature of 1,400 to 1,700° C. an amorphous ceramic fiber comprising silicon, carbon, and oxygen in an environment comprising boron oxide vapor, wherein the boron oxide vapor is produced by a reaction of a boron containing material with an oxidizing agent in situ during heating,
      wherein the boron containing material is selected from the group consisting of boron carbide, boron, and $B_6O$, and the oxidizing agent is selected from the group consisting of carbon dioxide, carbon monoxide, oxygen, and combinations thereof; and
   ii) thereafter densifying the fiber in an inert environment at a temperature of 1,800 to 2,200° C.

11. The process of claim 10, wherein heating is carried out at a temperature of 1,500 to 1,600° C.

12. The process of claim 10, wherein the densification is carried out at a temperature of 1,800 to 2,000° C.

13. The process of claim 10, wherein the inert environment comprises argon.

* * * * *